(12) United States Patent
Sakata

(10) Patent No.: US 7,228,435 B2
(45) Date of Patent: Jun. 5, 2007

(54) PROGRAM EXECUTING METHOD IN SERVICE SYSTEM AND PROGRAM EXECUTING APPARATUS FOR THE SAME

(75) Inventor: Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 776 days.

(21) Appl. No.: 10/288,524

(22) Filed: Nov. 6, 2002

(65) Prior Publication Data

US 2003/0217284 A1    Nov. 20, 2003

(30) Foreign Application Priority Data

Nov. 8, 2001    (JP) .............................. 2001-342710

(51) Int. Cl.
- G06F 11/30    (2006.01)
- G06F 12/14    (2006.01)
- H04L 9/32     (2006.01)
- H04L 9/00     (2006.01)

(52) U.S. Cl. ...................... 713/189; 713/165; 713/166; 713/167; 713/190; 711/163; 711/164

(58) Field of Classification Search ................ 713/200, 713/167
See application file for complete search history.

(56) References Cited

U.S. PATENT DOCUMENTS

| | | | | |
|---|---|---|---|---|
| 5,765,206 A | * | 6/1998 | Hohensee et al. | 711/203 |
| 5,870,477 A | * | 2/1999 | Sasaki et al. | 713/165 |
| 5,968,175 A | * | 10/1999 | Morishita et al. | 726/28 |
| 6,308,274 B1 | * | 10/2001 | Swift | 726/9 |
| 6,751,509 B2 | * | 6/2004 | Hirayama | 700/21 |
| 6,871,277 B1 | * | 3/2005 | Keronen | 713/167 |
| 6,941,473 B2 | * | 9/2005 | Etoh et al. | 726/5 |

FOREIGN PATENT DOCUMENTS

| | | |
|---|---|---|
| EP | 1 132 801 A2 | 9/2001 |
| EP | 1 139 223 A2 | 10/2001 |
| JP | 9-138735 A | 5/1997 |
| JP | 2000-276457 A | 10/2000 |
| JP | 2001-5720 A | 1/2001 |
| JP | 2001-148697 A | 5/2001 |
| WO | WO 00/22796 A1 | 4/2000 |
| WO | WO 01/29791 A1 | 4/2001 |

* cited by examiner

Primary Examiner—Taghi T. Arani
Assistant Examiner—Arezoo Sherkat
(74) Attorney, Agent, or Firm—Sughrue Mion, PLLC

(57) ABSTRACT

A program executing apparatus includes a first storage section which stores data permitted to be leaked out; a second storage section which stores secret data of a user; a communication section which can communicate with an external unit; a program storage section which stores at least one application program; and a program executing section, checks a possibility that the secret data could be leaked out to the external unit, and stops the execution of the at least one application program when it is determined that the secret data could be leaked out. The check of the possibility that the secret data could be leaked out is based on whether the at least one application program contains a process of communicating with the external unit or a process of writing data in the first storage section and a process of reading the secret data from the second storage section.

16 Claims, 13 Drawing Sheets

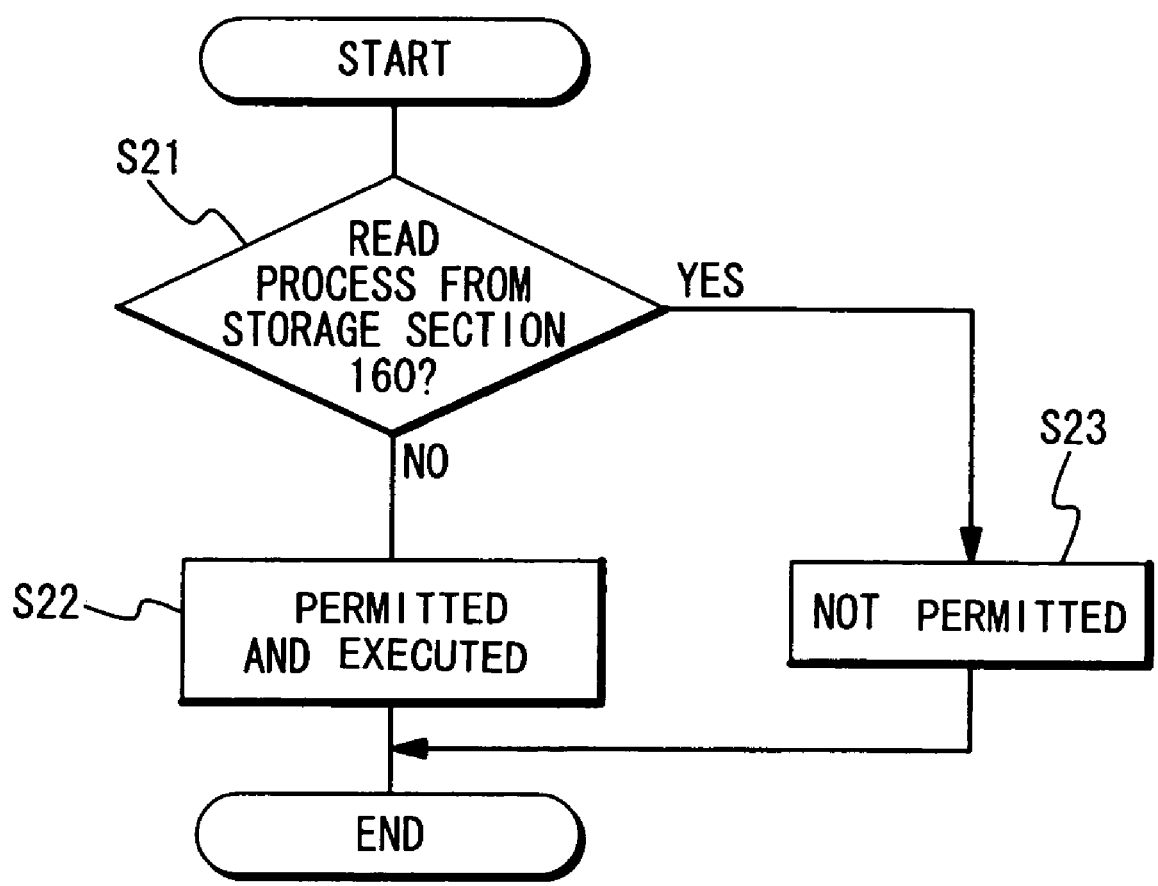

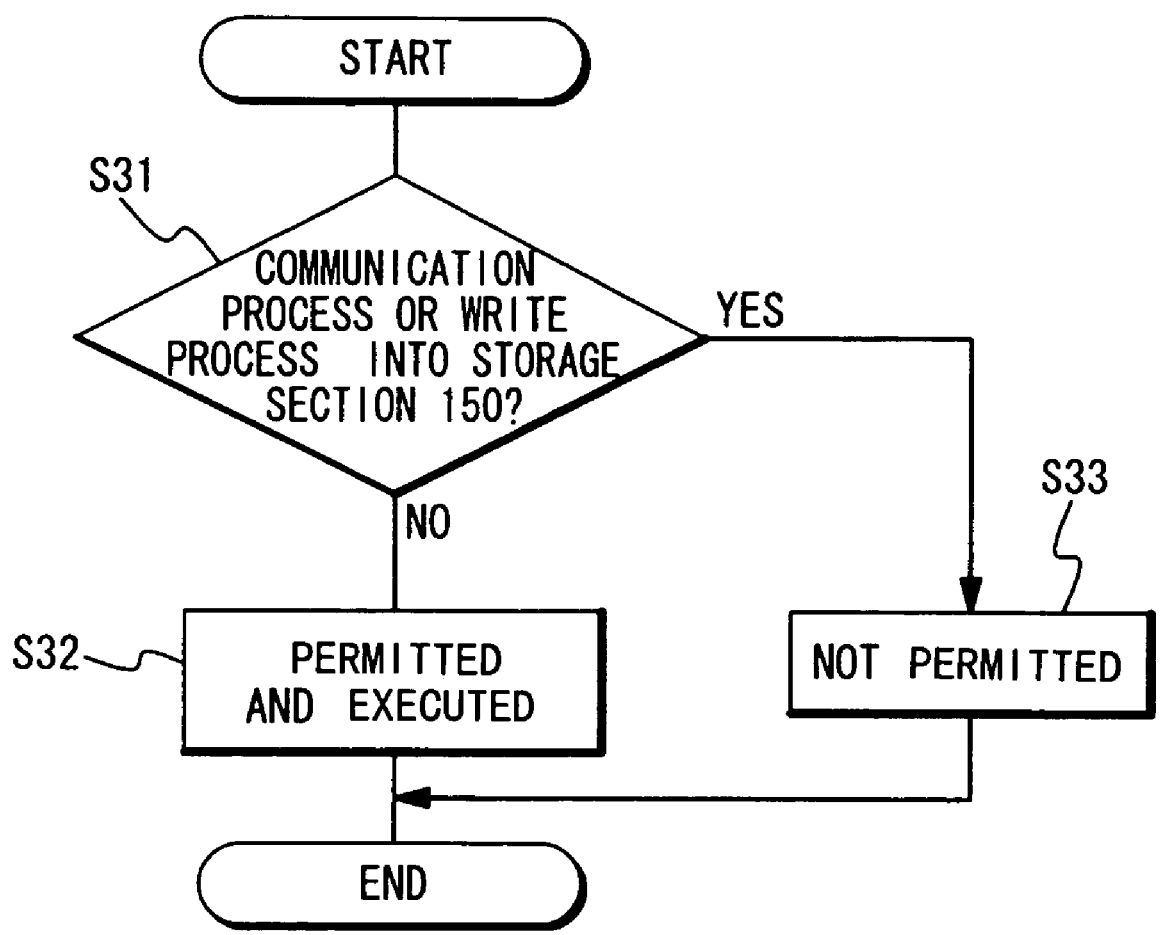

PROGRAM EXECUTING METHOD IN SERVICE SYSTEM AND PROGRAM EXECUTING APPARATUS FOR THE SAME

BACKGROUND OF THE INVENTION

1. Field of the Invention

The present invention relates to a program executing method in a service system and a program executing apparatus for the same.

2. Description of the Related Art

Conventionally, a system using a computer and a mobile terminal such as a mobile phone is known, as shown in FIG. 1. In such a system, a program is acquired or downloaded from a service provider through a network and is executed. Referring to FIG. 1, the system is composed of a program executing apparatus 500, a server 200 and a network 50 connecting them.

The program executing apparatus 500 is a mobile terminal in this example. The program executing apparatus 500 is composed of a program storage section 510, a program acquiring section 520, a program executing section 530, a communication section 540, a storage section 550 and a personal data generating section 560. The communication section 540 communicates with the server 200 through the network 50. The program acquiring section 520 acquires a program from the server 200 through the communication section 540. The program storage section 510 stores the program acquired by the program acquiring section 520. The program executing section 530 executes the program stored in the program storage section 510. The storage section 550 stores data. The personal data generating section 560 generates personal data such as the position data of a user using GPS (Global Positioning System).

Here, the program is the data in which the processes to be executed by the program executing apparatus 500 are described. The program executing section 530 interprets the program and executes the processes described therein. The processes to be executed by the program executing section 530 are a communication process with an external unit through the communication section 540, a read process and write process of the data from and into the storage section 550, an input/output process between the program executing apparatus 500 and a user through a user interface, and a reference process of the personal data in the personal data generating section 560.

Next, the operation of the above system will be described. A specific program for executing specific processes is stored in the server 200. An example of a service provided by the specific program is a game, an office work, a map display and so on. The user of the program executing apparatus 500 specifies an identifier of the specific program and requests acquisition of the specific program. The program acquiring section 520 acquires the specified program from the server in response to the request and stores it in the program storage section 510. Subsequently, the user requests the execution of the specific program stored in the program storage section 510. The specified program is interpreted and executed by the program executing section 530.

In this way, the user can receive the service provided by the specific program by acquiring the program stored in the server 200 and executing it. Here, there is a case that the specific program contains a read process of the data stored in the storage section 550 or a reference process of the personal data in the personal data generating section 560 by the program executing section 530, and a communication process through the communication section 540. In this case, however, there is a possibility that optional data in the storage section 550 and the personal data generating section 560 are transmitted through the network 50 to an external unit, such as the server 200 other than the program executing apparatus 500. As a result, the personal data stored in the storage section 550 and the personal data generated by the personal data generating section 560, i.e., the data about privacy and security are leaked to the external unit. In order to avoid such a situation, in the conventional program executing apparatus 500, only one of the communication function and the read function of the data in the storage section 550 and the personal data generating section 560 is given to the program executing apparatus 500. More specifically, the program executing apparatus 530 used has the communication function but does not have the read function of the data from the storage section 550 and the personal data generating section 560, or it has the read function of the data from the storage section 550 and the personal data generating section 560, but does not have the communication function.

It should be noted that in the former case, it is possible that the program executing apparatus 500 reads the personal data from a specific area of the storage section 550. For example, in the mobile terminal, an exclusive use storage section for only the program is provided. Also, the program executing section 530 limits a read process by a program to the storage section 550 and the personal data storage section 560—other than the exclusive use storage section—so that leakage of the personal data such as a telephone directory can be avoided. In this way, the program executing apparatus 500 is realized which can execute an external program while guaranteeing the safety of the personal data.

However, in the conventional program executing apparatus, even the process which never leaks internal data is prohibited as the result of the limitation of the program executing section 530. Specifically, a program cannot be executed in which the data stored in the server 200 and the data stored in the storage section 550 are combined to provide a service to the user. An example of such a program is a calendar display in which personal schedule data of the user, stored in the storage section 550, and weather forecast data for the near future, stored in the server 200, are combined. In this case, it is impossible to execute the above program in the conventional program executing apparatus, in spite of the fact that the personal data of the user is never leaked outside. If the program executing section 530 is provided with the read function of the data from the storage section 550 and the personal data generating section 560 in addition to the communication function, it is not possible to guarantee the avoidance of leakage of the internal data.

In conjunction with the above description, a continuation data server apparatus is disclosed in Japanese Laid Open Patent Application (JP-A-Heisei 9-138735). In this conventional example, the continuation data the server apparatus is composed of a plurality of data memory control units which read desired continuation data from a data storage section which stores the continuation data. The plurality of buffer storage sections hold the continuation data which is read out by the data memory control unit. At least one communication control section reads the continuation data which is held by the buffer storage sections and sends to an accommodated channel. The buffer storage section is provided for a combination of the data memory control unit and the communication control section.

Also, a data sharing computer system is disclosed in Japanese Laid Open Patent Application (JP-P2000-276457A). In this conventional example, the data sharing computer system is composed of a first computer system, a second computer system, a shared data storage section, and an access permission/non-permission data storage section. The shared data storage section has a plurality of data storage areas, and divisionally stores the shared data which is accessed by the first computer system and the second computer system from the plurality of data storage areas. The access permission/non-permission data storage section stores access permission/non-permission data for each data storage area of the shared data storage section to indicate whether the area is accessible or not. The first computer system is composed of a first service section, a first data access section connected with the shared data storage section, and a first exclusive control section connected with the access permission/non-permission data storage section. The first service section instructs an access to an optional data storage area to the first data access section and the first exclusive control section. The first exclusive control section acquires the access permission/non-permission data for the instructed data storage area, and determines the permission or non-permission of the access to the instructed data storage area. When it is determined to be accessible, the first exclusive control section changes the access permission/non-permission data corresponding to the instructed data storage area into an access non-permission data. The first data access section accesses the instructed data storage area after the instructed data storage area is determined to be accessible by the first exclusive control section, and the access permission/non-permission data is changed into the access non-permission data. The first exclusive control section changes the access permission/non-permission data for the instructed data storage area into the permission data after the first data access section acceses the instructed data storage area.

The second computer system is composed of a second service section, a second data access section connected with the shared data storage section, and a second exclusive access control section connected with the access permission data storage section. The second service section instructs an access to an optional data storage area to the second data access section and the second exclusive access control section. The second exclusive access control section acquires the access permission/non-permission data corresponding to the instructed data storage area, and determines the permission of the access to the instructed data storage area. When it is determined to be accessible, the second exclusive access control section changes the access permission/non-permission data corresponding to the instructed data storage area into the non-permission data. The second data access section accesses the data storage area determined to be accessible by the second exclusive access control section after the access permission/non-permission data is changed into the non-permission data. The second exclusive access control section changes the access permission/non-permission data corresponding to the instructed data storage area into the permission data after the instructed data storage area is accessed by the second data access section.

Also, a sharing memory access control apparatus is disclosed in Japanese Laid Open Patent Application (JP-P2001-5720A). In this conventional example, the sharing memory access control apparatus is provide to control accesses to a dual port-type memory by each process in the environment in which a plurality of processes sharing the dual port-type memory uses the memory and carries out the processes. The memory contains control data which includes a plurality of bits and whose values are updated in accordance with the cooperation of the plurality of processes. The sharing memory access control apparatus is composed of a detection section for detecting the values of the control data and an updating section for updating the values of the control data. An instructing section controls the detection section to repeat the detecting operation of the values of the control data until the values of the control data are updated to predetermined values by the other processes. When the update of the values to the predetermined values is detected by the detection section, the instructing section instructs a self-process to operate the process. When the operation of the self-process completes, the instructing section instructs the updating section to change the bits of "1" of the control data into "0" and communicates the progress to the other process.

Also, a method of communicating data through a channel with a low reliability is disclosed in Japanese Laid Open Patent Application (JP-P2001-148697A). This conventional example is relates to a method of manufacturing a device used by an operator and communicated with another device which acts on the operator. A maker has a maker key which it is impossible to acquire for a stranger other than the maker and an agent permitted by the maker, the communication is carried out by use of the channel with the low reliability which is not guaranteed from the message change. The device is manufactured to be not necessary to contain a secret about the operator and to contain a secure section as a circuit contained in the transformation impossible boundary. The device is initialized using a specific device identifier by the manufactured device.

SUMMARY OF THE INVENTION

Therefore, an object of the present invention is to provide a program executing method in a service system and a program executing apparatus, in which it is possible to guarantee the avoidance of leakage of internal data.

Another object of the present invention is to provide a program executing method in a service system and a program executing apparatus, in which internal data of the program executing apparatus and external data in a server can be both used without leakage of the internal data.

In an aspect of the present invention, a program executing apparatus includes a first storage section which stores data permitted to be leaked out, a second storage section which stores secret data of a user, a communication section which can communicate with an external unit, and a program storage section which stores at least one application program. A program executing section interprets and executes the application program, checks a possibility that the secret data is leaked out to the external unit while interpreting the application program, and stops the execution of the application program when it is determined that there is the possibility that the secret data is leaked out.

Here, the program storage section stores an operating system, and the program executing section operates based on the operating system to interpret and executes the application program, to check the possibility that the secret data is leaked to the external unit while interpreting the application program, and to stop the execution of the application program when it is determined that there is the possibility that the secret data is leaked out.

Also, the program executing apparatus may further include a personal data generating section which generates personal data of the user. The secret data includes the generated personal data.

Also, the check of the possibility that the secret data is leaked to the external unit is based on whether the application program preferably contains a process of communicating with the external unit or writing data in the first storage section and a process of reading the secret data from the second storage section.

In this case, the program executing section may include a status storage section, an interpreting section and an execution permission/non-permission determining section. The status storage section stores status data of the application program, and the status data is initially set to first data. The interpreting and executing section interprets and executes the application program. The execution permission/non-permission determining section sets the status data to second data when the process to be executed is the process of communicating with the external unit or writing the data in the first storage section, and sets the status data to third data when the process to be executed is the process of reading the secret data from the second storage section. The execution permission/non-permission determining section checks the status data each time interpreting each of processes of the application program, and stops the execution of the application program if the status data is the third data when the process to be executed is the process of communicating with the external unit or writing the data in the first storage section, and if the status data is the second data when the process to be executed is the process of reading the secret data from the second storage section.

Also, the application program is acquired from the external unit through the communication section and a communication channel. In this case, the program executing apparatus may be a mobile terminal, and the application program is acquired from the external unit through the communication section and a wireless communication channel.

Also, the program storage section may store a plurality of application programs including first and second application programs. The first application program contains the process of communicating with the external unit or writing the data in the first storage section, but does not contain the process of reading the secret data, and the second application program contains the process of reading the secret data, but does not contain the process of communicating with the external unit or writing the data in the first storage section. At this time, the program executing section executes one of the first and second application program to use data manipulated based on the other such that a combination of the data manipulated based on the first application program and the data manipulated based on the second application program is displayed.

Also, the program storage section may store a plurality of application programs. The program executing section may include first and second sections, each of which interprets and executes the application program, and a selecting section which interprets the application program to determine whether the application program contains the process of communicating with the external unit or writing the data in the first storage section, or the process of reading the secret data, and allocates the application program to the first section when the application program contains the process of communicating with the external unit or writing the data in the first storage section, and to the second section when the application program contains the process of reading the secret data.

In another aspect of the present invention, a program executing method in a terminal, is achieved by (a) interpreting and executing each of a plurality of application programs; by (b) checking a possibility that secret data of a user in the terminal is leaked out to an external unit while interpreting the application program, a first storage section storing data permitted to be leaked out, and a second storage section storing the secret data; and by (c) stopping the execution of the application program when it is determined that there is the possibility that the secret data is leaked out.

Here, the (a) to (c) steps may be executed based on an operating system in the terminal.

Also, in the program executing method, personal data of the user may be generated as a part of the secret data.

Also, the (b) checking step may be achieved by checking whether the application program contains a process of communicating with the external unit or writing data in the first storage section; and by checking a process of reading the secret data from the second storage section.

Also, the (b) checking step may be achieved by setting status data, which indicates a status of the application program and is initially set to first data, to second data when a process to be executed of the application program is the process of communicating with the external unit or writing data in the first storage section; by setting the status data to third data when a process to be executed is the process of reading the secret data from the second storage section; by checking the status data each time interpreting each of processes of the application program; and by stopping the execution of the application program if the status data is the third data when the process to be executed is the process of communicating with the external unit or writing the data in the first storage section, and if the status data is the second data when the process to be executed is the process of reading the secret data from the second storage section.

Also, the application program may be acquired from the external unit through a communication channel. In this case, when the terminal is a mobile terminal, the application program can be acquired from the external unit through a wireless communication channel.

Also, the plurality of application programs may include first and second application programs, by which a storage area of the first storage section is shared for specific data. The first application program contains the process of communicating with the external unit to acquire the specific data and writing the specific data in the shared storage area of the first storage section but does not contain the process of reading the secret data from the second storage section, and the second application program contains the process of reading the secret data from the second storage section and the specific data from the shared storage area of the first storage area but does not contain the process of communicating with the external unit or writing any data in the first storage section. Thus, a combination of the specific data and the secret data is displayed based on the second application program.

Also, when the terminal may include first and second sections, the method may further includes interpreting the application program to determines whether the application program contains the process of communicating with the external unit or writing data in the first storage section or the process of reading the secret data from the second storage section; allocating the application program to the first section such that the first section carries out the (a) to (c) steps to the application program when the application program contains the process of communicating with the external unit or writing data in the first storage section; and allocating the application program to the second section such that the second section carries out the (a) to (c) steps to the application program when the application program contains the process of reading the secret data from the second storage section.

BRIEF DESCRIPTION OF THE DRAWINGS

FIG. 12 is a flow chart showing the operation of the program interpreting and executing section (A) in the program executing apparatus according to the second embodiment of the present invention; and FIG. 13 is a flow chart showing the operation of the program interpreting and executing section (B) in the program executing apparatus according to the second embodiment of the present invention.

DETAILED DESCRIPTION OF EXEMPLARY EMBODIMENTS

Hereinafter, a program executing apparatus in a service system of the present invention will be described with reference to the attached drawings.

Figure 1:
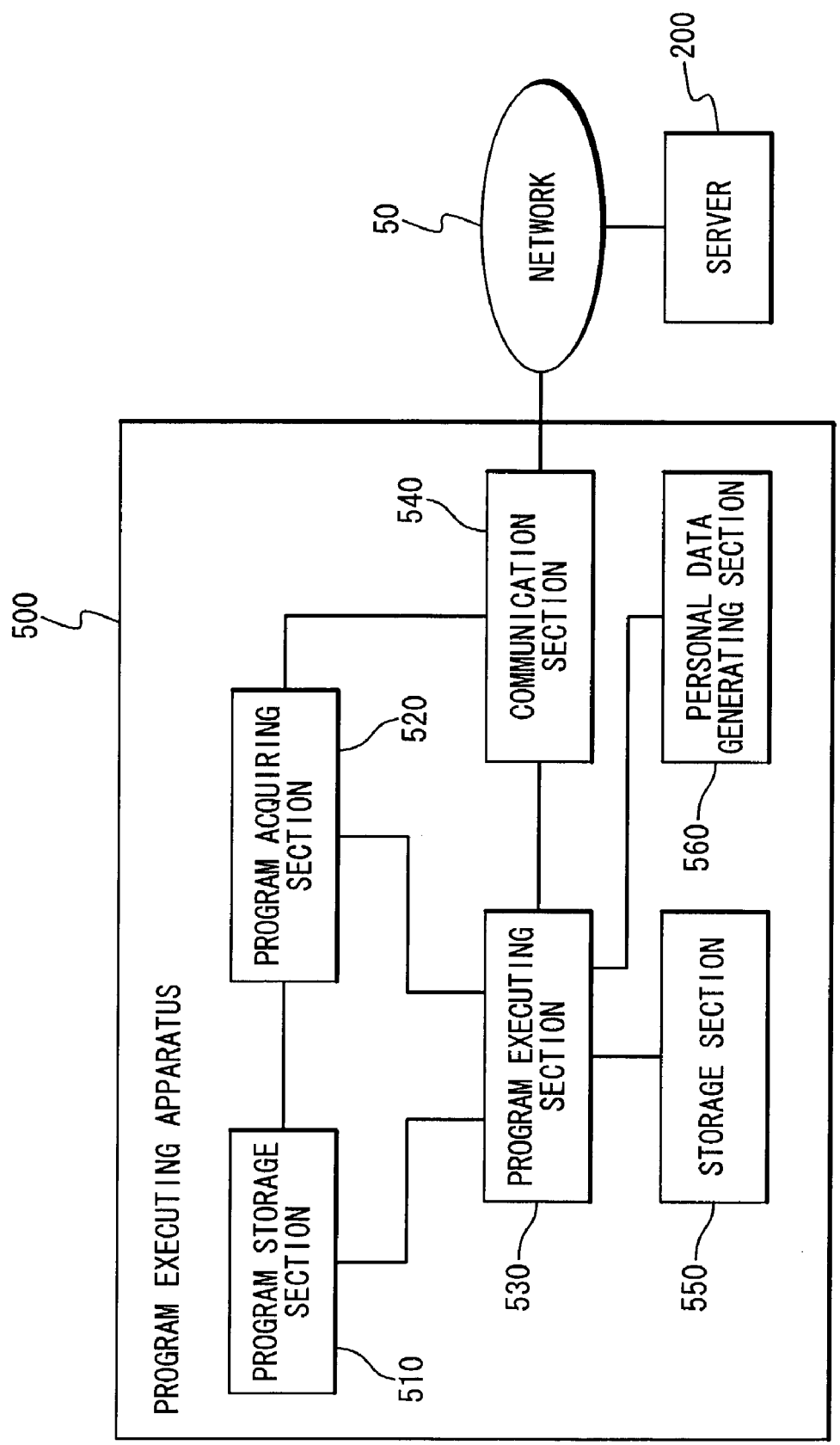
FIG. 1 is a block diagram showing the structure of a conventional program executing apparatus.
Figure 2:
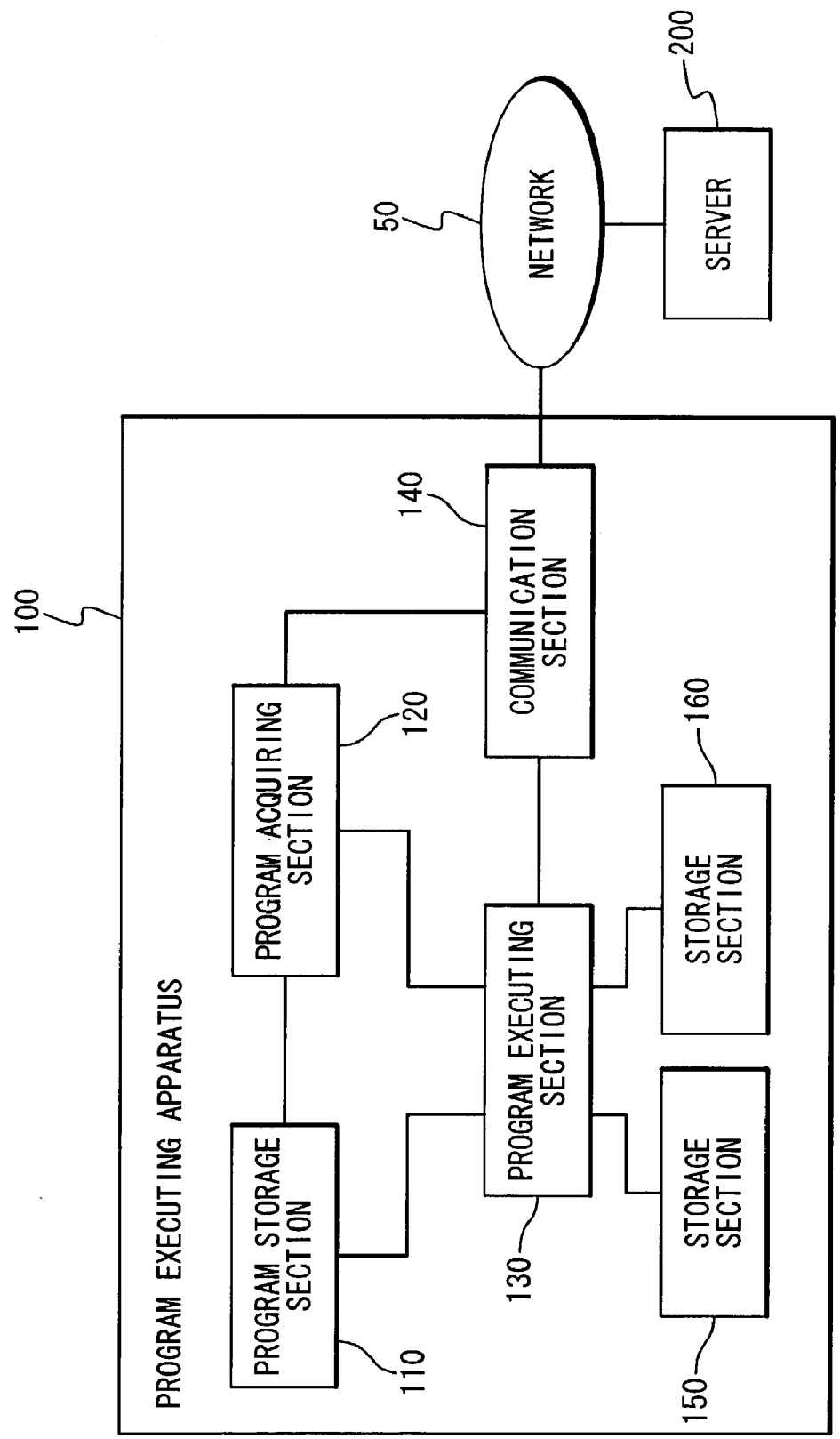
FIG. 2 is a block diagram showing the structure of a program executing apparatus according to a first embodiment of the present invention.

FIG. 2 is a block diagram showing the structure of a service system according to the first embodiment of the present invention. Referring to FIG. 2, the service system is composed of a program executing apparatus 100, a server 200 as a service provider for data service, and a network 50 which connects the program executing apparatus 100 as a mobile terminal or a computer and the server 200. The network 50 includes the Internet or an intranet. The program executing apparatus 100 may be connected with the network 50 with radio or a wire. Below, persons using the program executing apparatus 100 and the server 200 are called a user and a manager, respectively.

The program execution section 100 is composed of a program storage section 110, a program acquiring section 120, a program executing section 130, a communication section 140, and storage sections 150 and 160. The program storage section 110 includes a previously stored operating system (OS) and also may store application programs. The program acquiring section 120, the program executing section 130, and the communication section 140 operate based on the operating system. The operating system manages the storage areas of the storage sections 150 and 160.

The communication section 140 communicates with the server 200 through the network 50. The program acquiring section 120 acquires an application program from the server 200 through the communication section 140 based on the operating system in response to a request by the user from an input section (not shown). Here, the application program is data in which the processes to be executed by the program executing apparatus 100 are described. The program storage section 110 stores the application program acquired by the program acquiring section 120 in addition to the operating system (OS) and the application programs. The program executing section 130 interprets and executes the acquired application program based on the operating system.

The storage sections 150 and 160 have functions to store data. The program executing section 130 can distinguish the storage section 150 and the storage section 160. The storage sections 150 and 160 may be physically provided as two separate storage sections, or may be logically provided as two separate storage sections by dividing one storage unit into two parts using addresses or file systems.

The program executing section 130 interprets one application program and executes processes described in the application program. The program executing section 130 achieves various functions by executing the application program on the operating system. The function provided by the application program is a game, an office work, a map display, a data service or the like. Also, the processes examples executed by the program executing section 130 are as follows:

(1) A communication process with an external unit through the communication section 140;
(2) A read process and a write process of data from and into the storage section 150;
(3) A read process and a write process of data from and into the storage section 160;
(4) An input process from an input section (not shown) by the user of the program executing apparatus 100;
(5) An output process of display on a display section (not shown) to the user of the program executing apparatus 100.

Next, the details of the function of each section of the program executing apparatus 100 will be described. The program acquiring section 120 acquires an application program from the server 200 through the communication section 140 and the network 50 in response to a specification from the input section by the user or a specification from the program executing section executing an application program or a specific unit. Here, the specific unit in this case means a unit other than the program executing apparatus 100. The program storage section 110 stores the acquired application program.

The program executing section 130 interprets and executes a specified application program on the operating system. It should be noted that the application program is acquired by the program acquiring section 120 and stored in the program storage section 110, or the application program may be supplied directly to the program executing section 130.

Figure 3:
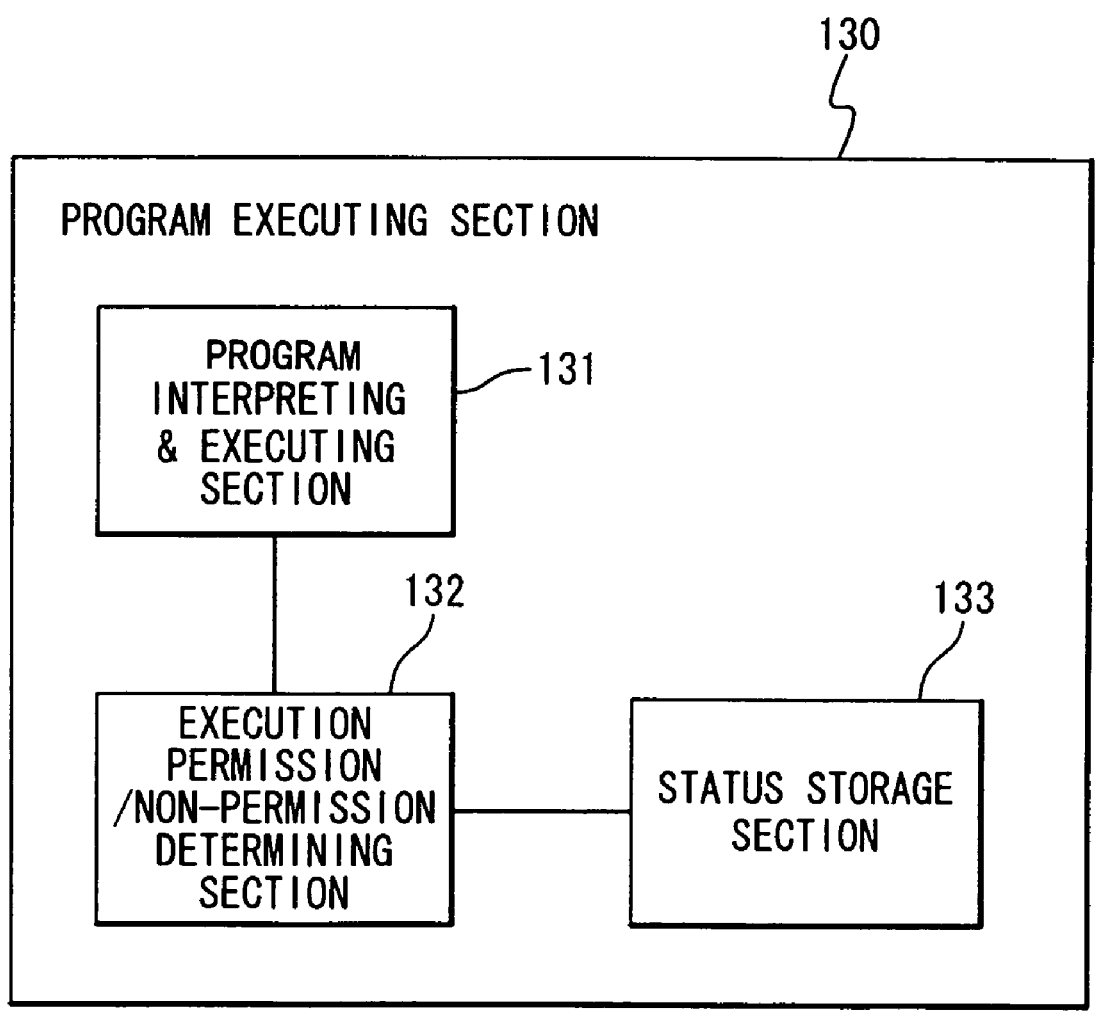
FIG. 3 is a block diagram showing the structure of a program executing section in the program executing apparatus in the first embodiment.

FIG. 3 shows the detailed structure of the program executing section 130. Referring to FIG. 3, the program executing section 130 is composed of a program interpreting and executing section 131, an execution permission/non-permission determining section 132, and a status storage section 133. The program interpreting and executing section 131 interprets the application program and executes processes described in the application program on the operating system. The execution permission/non-permission determining section 132 determines the permission or non-permission of the execution of each process described in the program each time the process is interpreted. The status storage section 133 has a flag (not shown) indicating the status of the application program on execution. The flag is set or reset by the execution permission/non-permission determining section 132.

The program executing section 130 guarantees a that "'communication process' or 'write process into the storage section 150'" and a "read process from the storage section 160" are never executed in the same program. Hereinafter, the communication process and the write process to the storage section 150 are referred to as process group A and the read process from the storage section 160 is referred to as process group B.

In the program executing section 130, the program interpreting and executing section 131 interprets the application program, and the execution permission/non-permission determining section 132 determines based on the flag, whether each of the processes is permitted to be executed. When the process is determined to be permitted, the program interpreting and executing section 131 executes the process. On the other hand, when the process is determined to be not permitted, the execution permission/non-permission determining section 132 prohibits the execution of the application program, and the program interpreting and executing section 131 stops the execution of the application program. Instead, the program executing section 130 executes a predetermined process. An example of the predetermined process is the display of an error dialog. No process may be executed when the process is determined to be not permitted.

Figure 4:
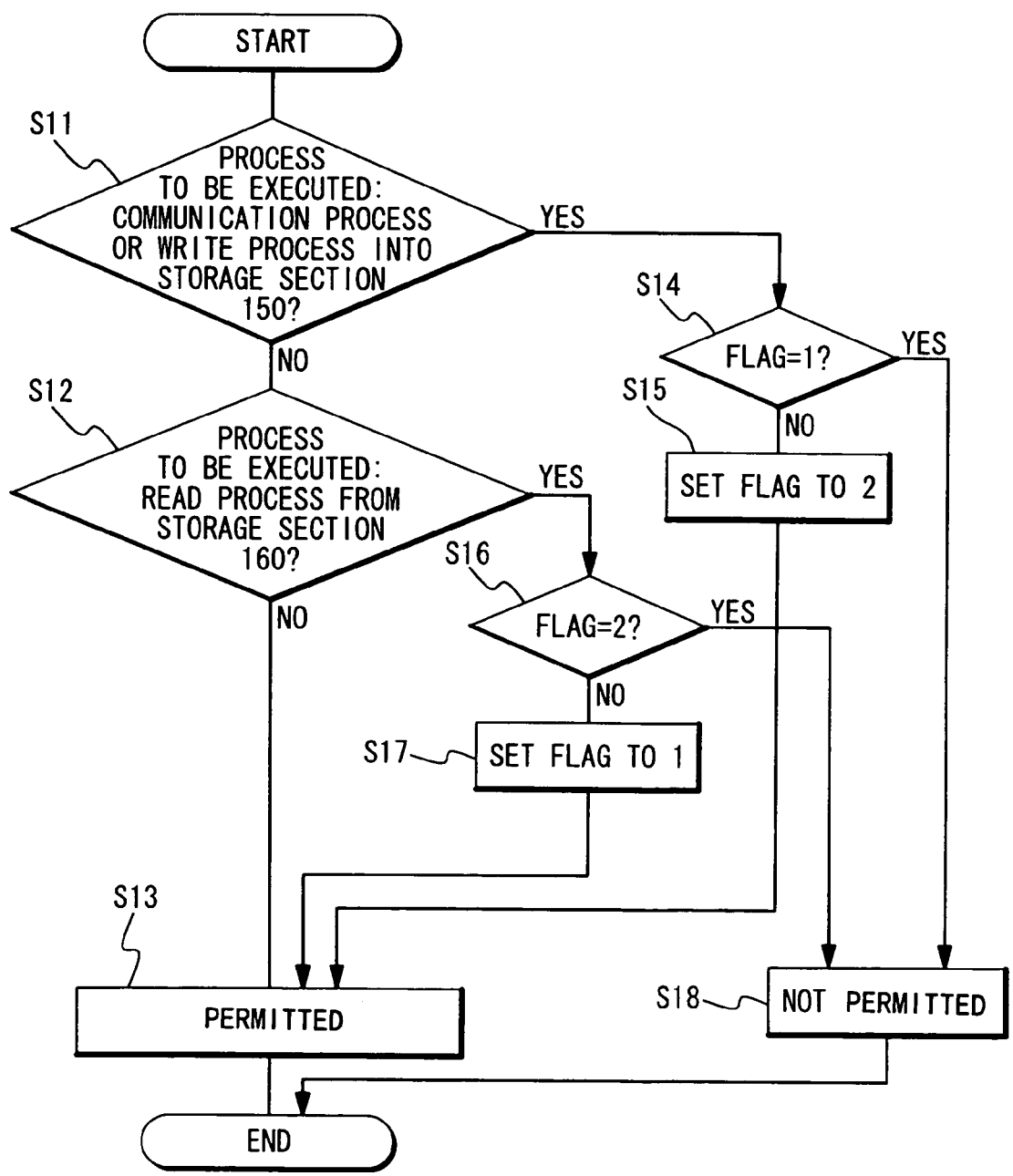
FIG. 4 is a flow chart showing the operation of an execution permission determining section of the program executing apparatus in the first embodiment.

FIG. 4 shows a flow of the determining process carried out by the execution permission/non-permission determining section 132. Here, in the status storage section 133, the flag (not shown) showing the execution state of the application program (status data) is managed. The flag takes either of three values of "not set" or "0", "1" and "2". In the initial state, the value of the flag is "not set".

Next, the determining process executed by the execution permission/non-permission determining section 132 based on the operating system will be described in detail with reference to FIG. 4. The determining process is a part of the operating system.

The program interpreting and executing section 131 interprets the processes of the application program and notifies the interpreting result to the execution permission/non-permission determining section 132. First, the execution permission/non-permission determining section 132 checks whether the interpreted process is a "'communication process' or 'write process into the storage section 150'", i.e., a process of the process group A (Step S11). When it is determined in the step S11 that the interpreted process is not any process of the process group A (Step S11, NO), the execution permission/non-permission determining section 132 examines whether the interpreted process is a "read process from the storage section 160", i.e., a process of the process group B (Step S12). When it is determined in the step S12 that the interpreted process is not any process of the process group B (Step S12, NO), the execution permission/non-permission determining section 132 determines that the execution of the interpreted process is "permitted" (Step S13), and ends the determining process.

When the requested process is determined in the step S11 to be a process of the process group A (Step S11, YES), the execution permission/non-permission determining section 132 refers to the status storage section 133 to determine whether or not the status flag is "1" (Step S14). When the flag is "1" in the step S14 (Step S14, YES), the execution permission/non-permission determining section 132 determines that the execution of the interpreted process is "not permitted" (Step S18), and ends the determining process.

When the flag is not "1" in the step S14 (Step S14, NO), the execution permission/non-permission determining section 132 sets the value of the flag to "2", (Step S15), and determines that the execution of the interpreted process is "permitted" (Step S13), and ends the determining process.

When the interpreted process is determined in the step S12 to be a process of the process group B (Step S12, YES), the execution permission/non-permission determining section 132 refers to the status storage section 133 to examine whether or not the status flag is "2" (Step S16). When the flag is "2" in the step S16 (Step S16, YES), the execution permission/non-permission determining section 132 determines that the execution of the requested process is "not permitted" (Step S18), and ends the determining process. When the flag is not "2" in the step S16 (Step S16, NO), the execution permission/non-permission determining section 132 sets the value of the flag to "1", (Step S17), determines that the execution of the requested process is "permitted" (Step S13), and ends the determining process.

In the above process, the execution permission/non-permission determining section 132 guarantees that both of the process of the process group A and the process of the process group B are never executed in the identical program. It should be noted that in the above-mentioned steps, the program executing section 130 may initially set the value of the flag to "1" or "2" based on an input from an external unit or data attached to the application program, in case of the start of the application program. In this case, at least one of the step S15 and the step S17 can be made unnecessary in the determining process occasionally.

Figure 5:
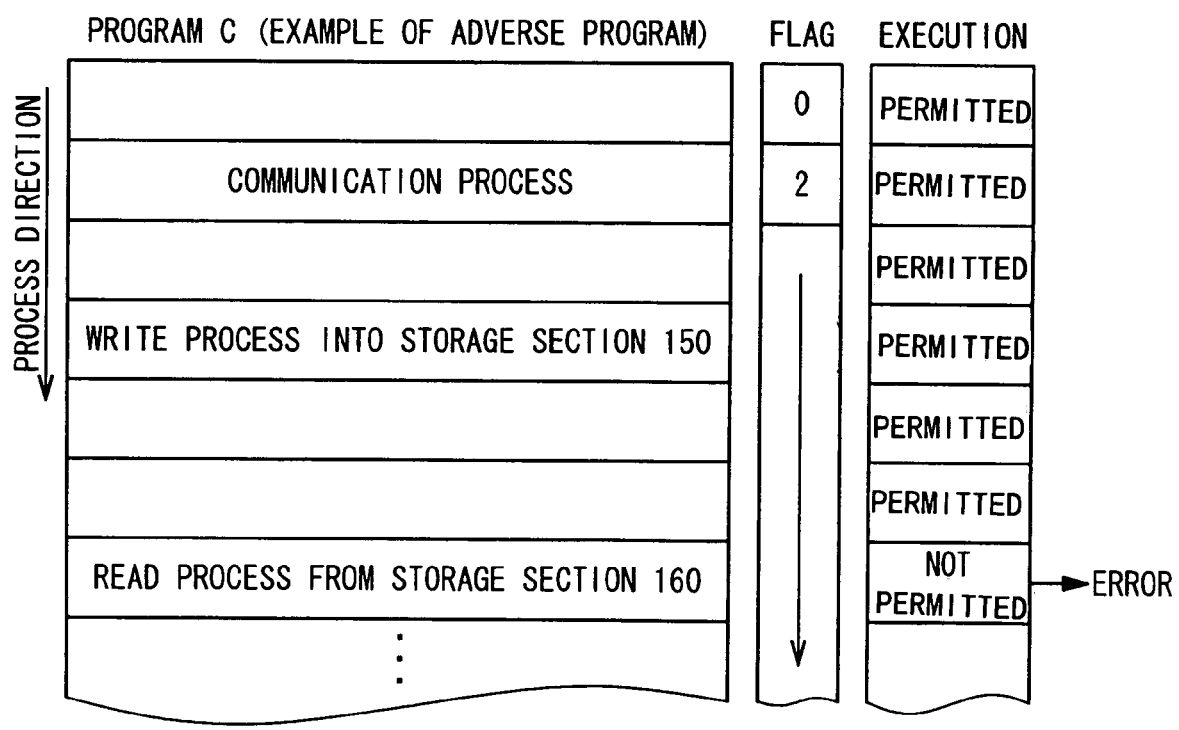
FIG. 5 is a diagram showing the processes of a program C executed in the program executing apparatus according to the first embodiment of the present invention.

FIG. 5 is a diagram showing an execution situation of a program C acquired from the server 200 by the program acquiring section 120 and executed by the program executing section 130, the value of the flag in the status storage section 0.133, and the execution permission/non-permission data of the execution permission/non-permission determining section 132. The program C contains a read process from the storage section 160 which is a process in the process group B, in addition to the communication process or the write process to the storage section 150 which is a process of the process group A.

At the initial time, the flag is "0". When a process shown as a blank at FIG. 5 other than the process groups A and B is to be executed, the process is determined as NO in the steps S11 and S12 of FIG. 4, and the process is permitted and executed (Step S13). Next, when the communication process to be executed, the communication process is determined as YES in the step S11 of FIG. 4. At this time, the flag is "0". Therefore, the communication process is determined as NO in the step S14 and the flag is set to "2" (Step S15). Thus, the communication process is permitted and executed (Step S13).

When a process shown as the following blank other than the process groups A and B is to be executed, the process is determined as NO in the steps S11 and S12 and the process is permitted and executed (Step S13). Next, when the write process into the storage section 150 is to be executed, the process is determined as YES in the step S11. Because the flag is "2", the process is permitted and executed. At this time, the flag value of "2" is not changed (Steps S15, S13).

In this way, the processes are executed. When the read process from the storage section 160, which is a process of the process group B, is to be executed, the read process is determined as YES in the step S12 and the flag is referred to in the step S16. At this time, because the flag is "2", the read process is determined as YES in the step S16 and is not permitted (Step S18). Therefore, the read process from the storage section 160 is not executed. At this point, an error is generated and the program C is stopped.

That is, the application program C contains processes of both the process group A and the process group B. Therefore, the application program C is regarded as a program which reads the personal data in the storage section 160 intentionally and leaks out to the server. The program executing section 130 can prevent the execution of the application program C.

Figure 6:
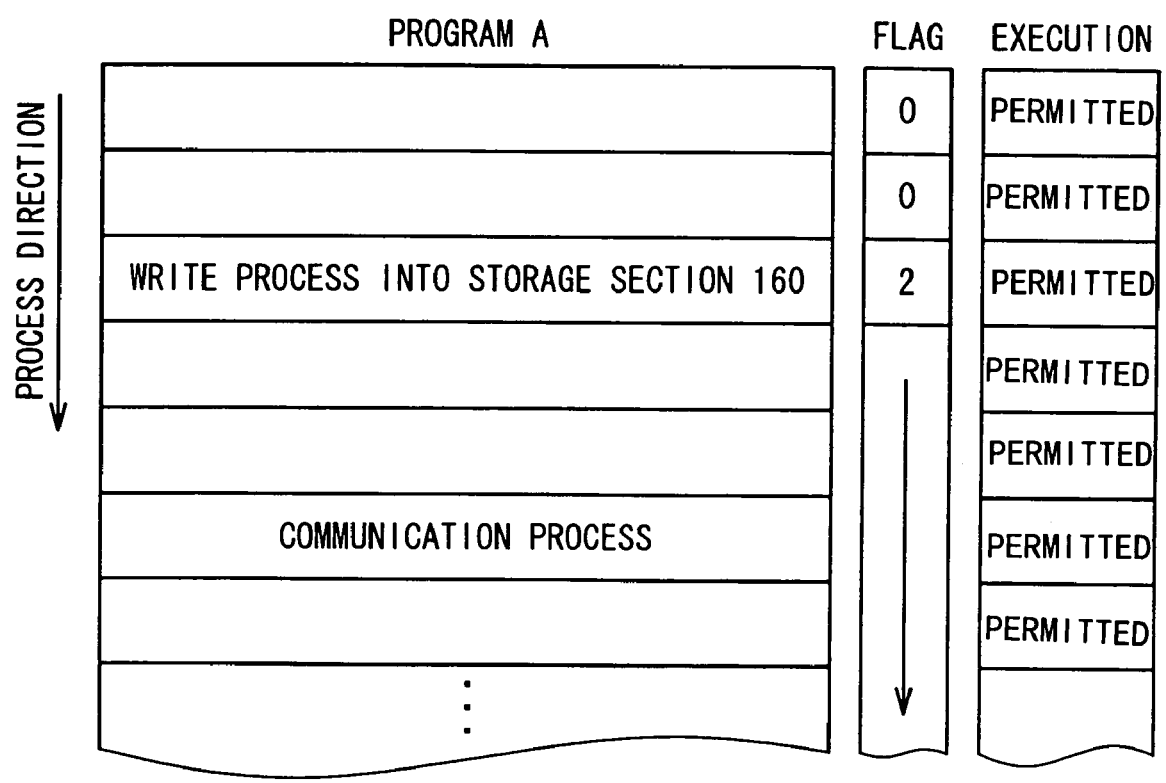
FIG. 6 is a diagram showing the processes of a program A executed in the program executing apparatus according to the first embodiment of the present invention.

FIG. 6 is a diagram showing an execution situation of the process of another program A acquired from the server 200 by the program acquiring section 120 and executed by the program executing section 130, the flag, and execution permission/non-permission data. As shown, the program A contains a communication process and a write process to the storage section 150 as the processes of the process group A but does not contain a read process from the storage section 160 as a process of the process group B.

Figure 7:
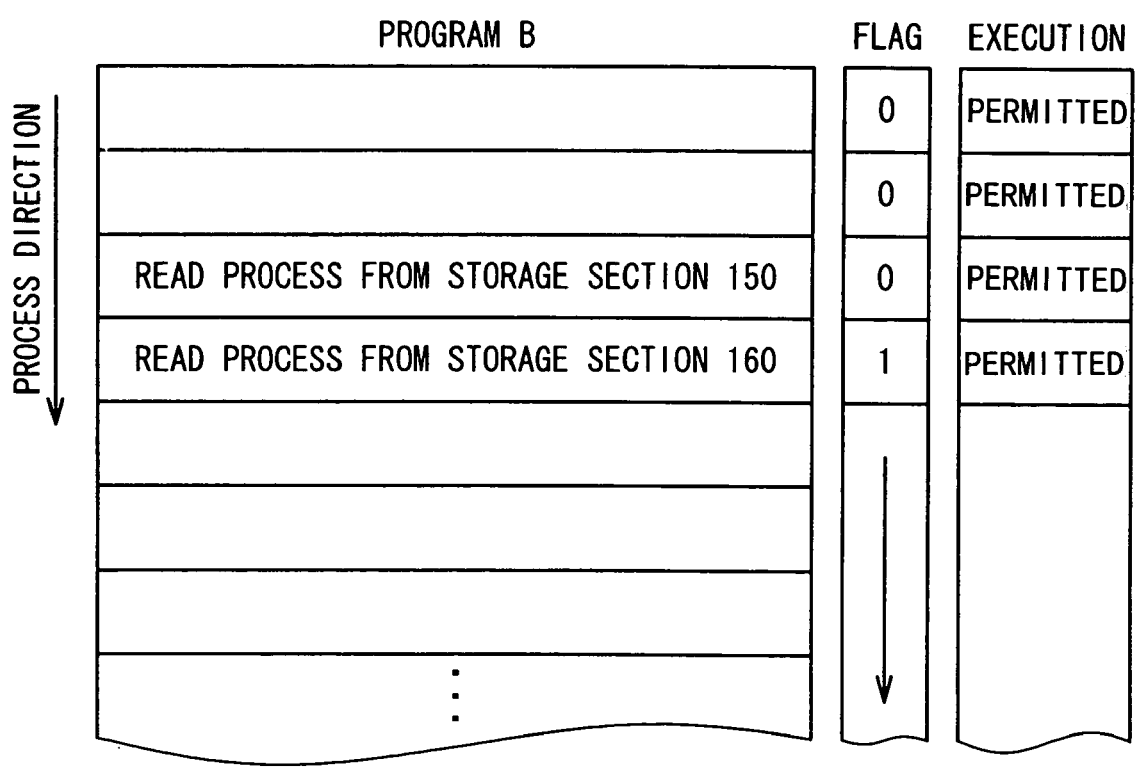
FIG. 7 is a diagram showing the processes of a program B executed in the program-executing apparatus according to the first embodiment of the present invention.

Also, FIG. 7 is a diagram showing a process of another program B acquired from the server 200 by program acquiring section 120 and executed by the program executing section 130, the flag, and execution permission/non-permission data. It is supposed in FIGS. 6 and 7 that the initial value of the flag is "0".

The application program A in FIG. 6 contains the processes of the process group A but does not contain the process of the process group B. Also, the program B in FIG. 7 contains the process of the process group B but does not contain any process of the process group A. Therefore, it is possible to execute the both application programs by the program executing section 130. The application programs A and B are acquired or downloaded by the program acquiring section 120 as separate application programs from the server 200, and are stored in the program storage section 110 as the application programs A and B, respectively. The application program A which contains the communication process is first executed by the program executing section 130 and then the program B is executed. Both of the application programs A and B may be executed concurrently in parallel.

Figure 8:
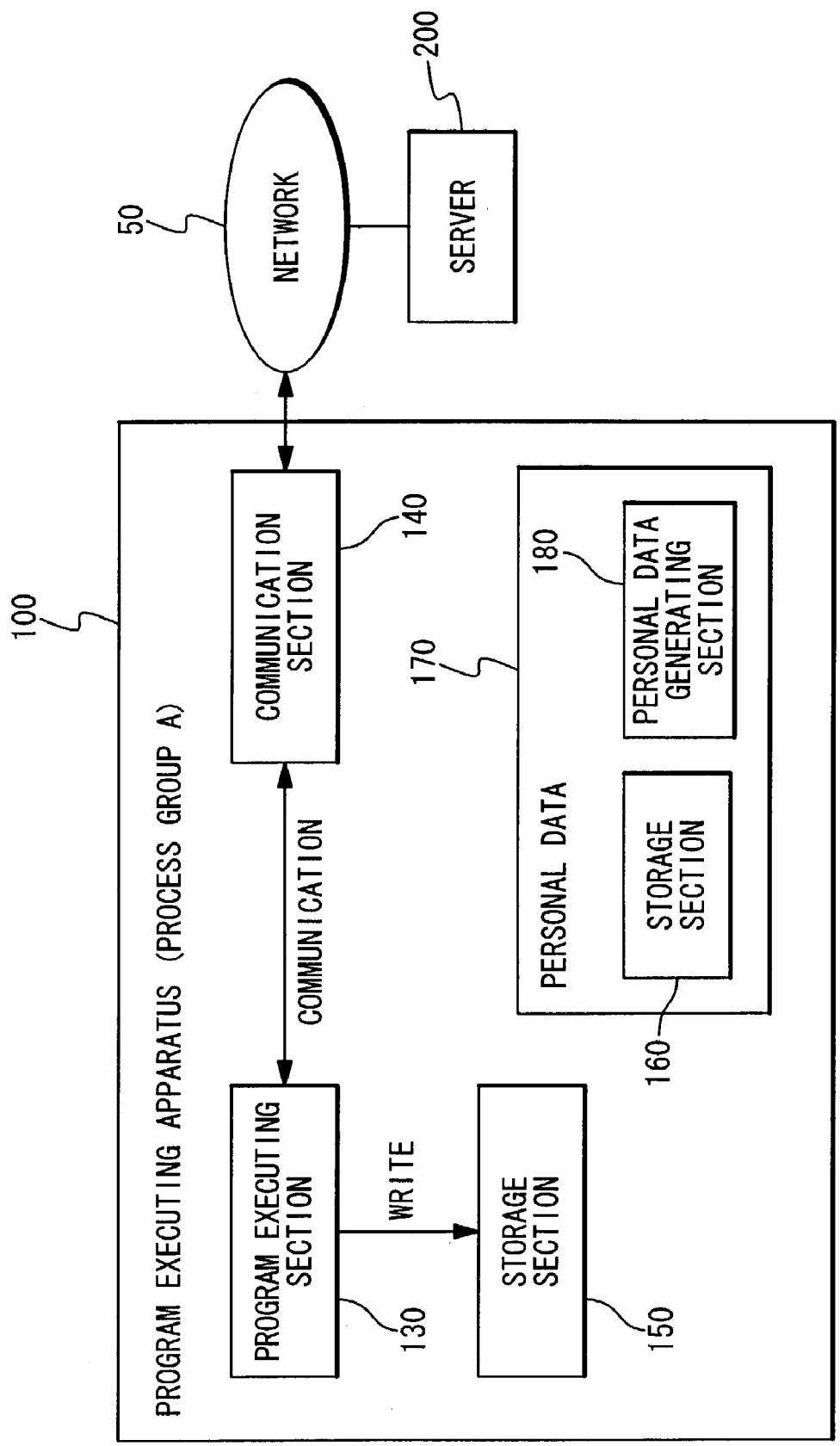
FIG. 8 is a diagram showing the operation of the program executing section in the program executing apparatus according to the first embodiment of the present invention.
Figure 9:
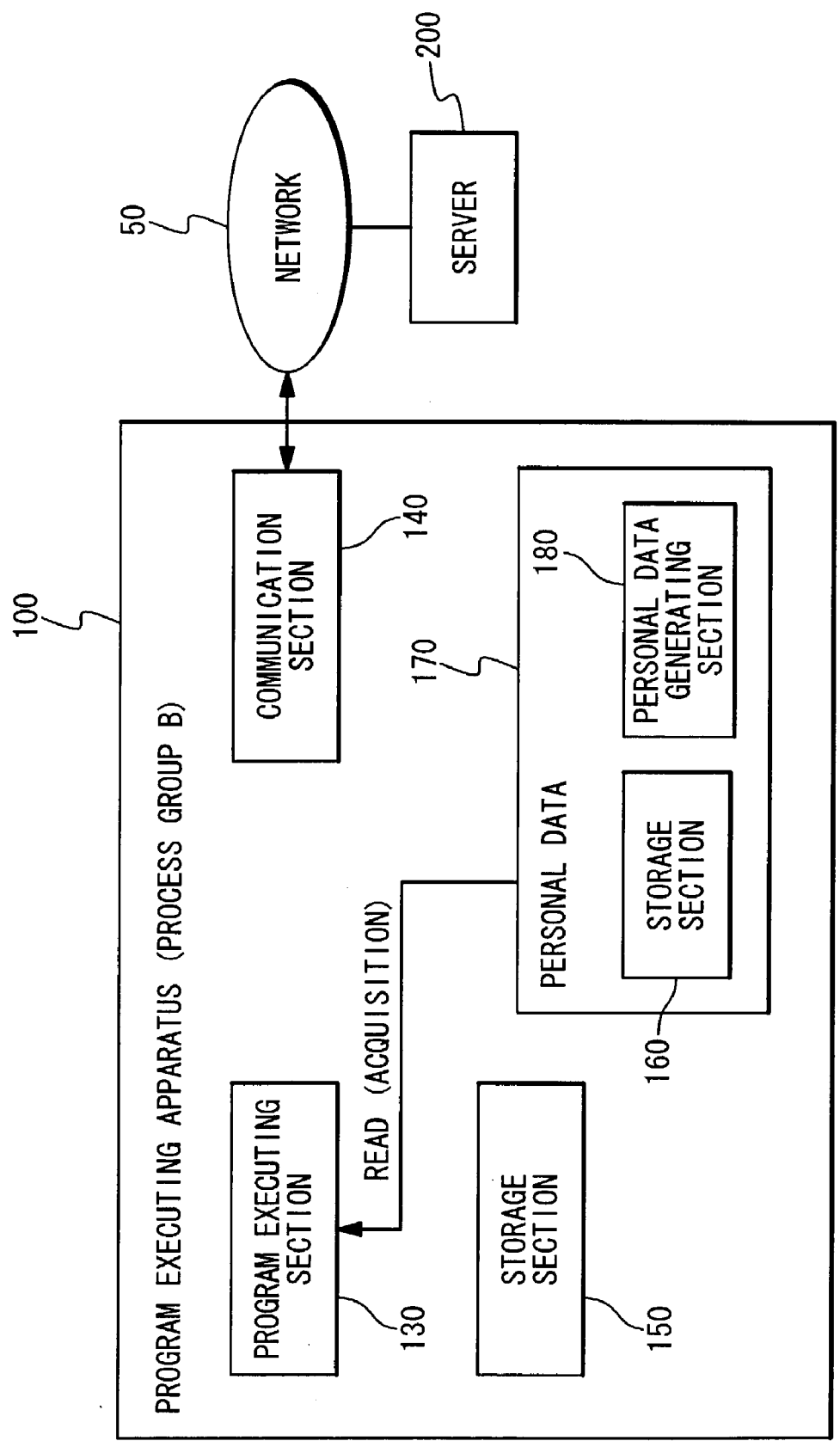
FIG. 9 is a diagram showing the operation of the program executing section in the program executing apparatus according to the first embodiment of the present invention.
Figure 10:
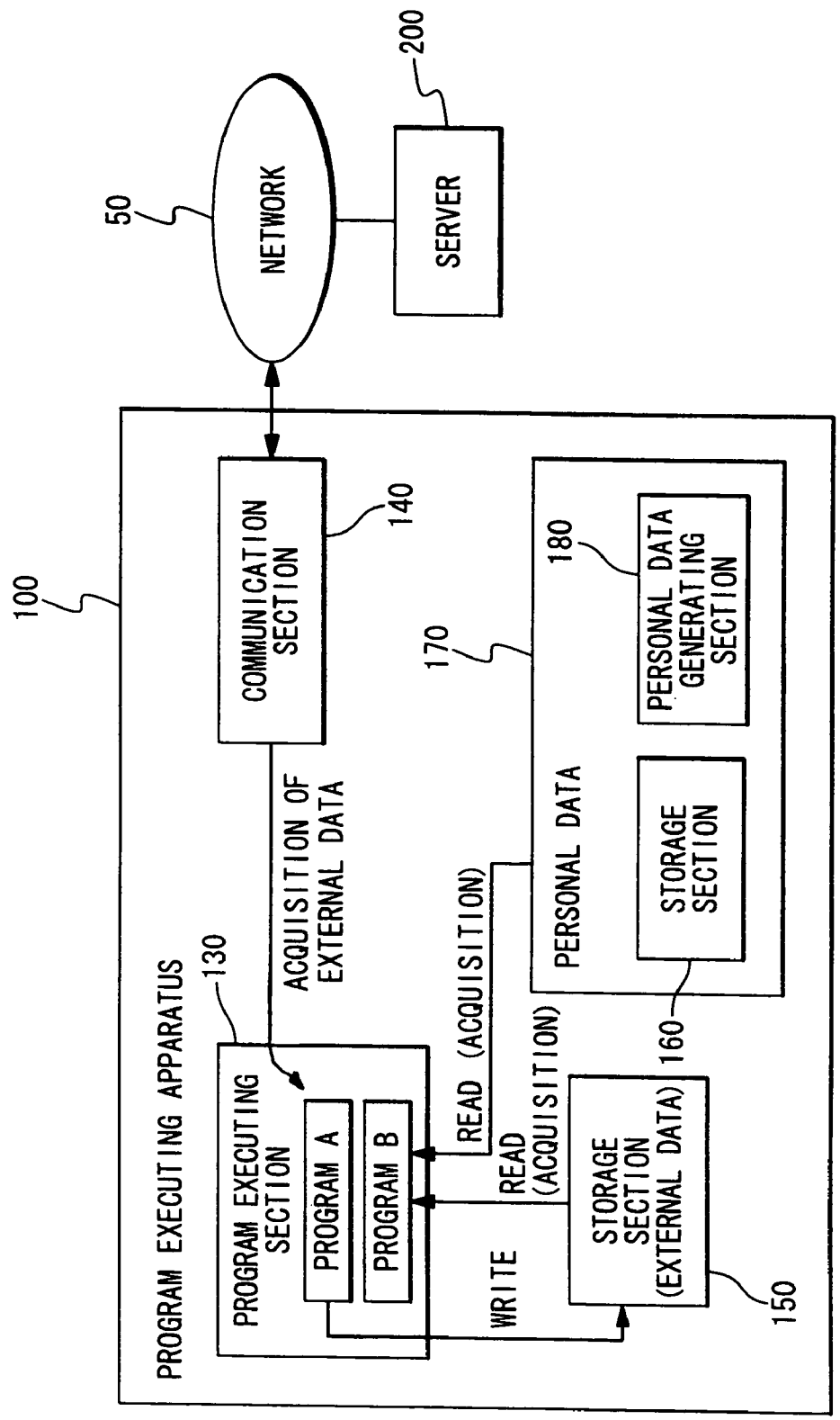
FIG. 10 is a diagram showing the effect of the present invention in the program executing apparatus according to the first embodiment of the present invention.

Next, referring to FIGS. 8, 9 and 10, it will be described that it is possible to use both of external data in the server and the internal personal data effectively by the application program while restraining the leakage of the internal personal data. In FIGS. 8, 9 and 10, the same components as in FIG. 2 are allocated with the same reference numerals. FIG. 8 is a diagram showing the program executing apparatus 100 which cannot execute the process group B. FIG. 9 is a diagram showing the program executing apparatus 100 which cannot execute the process group A. It should be noted that it is shown in FIGS. 8 and 9 that personal data 170 contains the data generated by a personal data generating section 180 in addition to the data stored in the storage section 160. An example of the personal data generated by the personal data generating section 180 is a current position data of the user, a blood pressure and pulse of the user showing a health state and so on.

In this way, the program executing section 130 executes the application program containing a process of the process group A to carry out a communication process and a write process into the storage section 150. However, the process of the process group B is not carried out. Also, the program executing section 130 executes the application program containing a process of the process group B to carry out a read process of the personal data 170. However, the process of the process group A is not carried out. Thus, the exclusive control becomes possible in actuality. FIG. 10 shows this state. By using the application program A and the application program B, both the external data and the internal personal data can be effectively used while preventing leakage of the internal personal data. That is, in the application program A of the two application programs, a communication process with the server 200 is carried out to acquire data from the server, and the acquired data is stored in the storage section 150. In the other application program B, the read processes of the data stored in the storage section 150 and the internal personal data stored in the storage section 160 are executed. In this case, application program A only executes processes of the process group A and application program B only executes processes of the process group B.

The application programs A and B may be provided by the server, or one of the application programs may be previously stored in the program executing apparatus. Also, two flags are provided for the application programs A and B. It should be noted that when the initial states of the flags can be set to the application programs, the flag to the application program A is set to "2" and the flag to the application program B is set to "1", respectively. Therefore, if the program executing apparatus executes the application programs A and B acquired from the server, a process in the application A can be executed in which external data in the server is stored in the storage section 150. In addition, a process in the application program B can be executed that reads both the external data stored in the storage section 150 and the internal data stored in the storage section 160 or generated by the personal data generating section 180.

In this way, the process which uses both of the external data and the internal personal data can be realized in the program executing apparatus. For example, the personal schedule data of the user stored in the program executing apparatus and weather forecast data in a few coming days provided from the server can be combined to display a calendar screen. In this process, the application program A communicates with the server to acquire the weather forecast data and to store in the storage section 150. The application program B reads the schedule data stored in the storage section 160 and reads the weather forecast data stored in the storage section 150. Thus, the program executing section 130 provides the display of the calendar screen obtained by combining both the data to the user.

As described above, in the program executing apparatus 100, it is guaranteed that both a process of the process group A and a process of the process group B are never carried out together in the same program. Therefore, it is guaranteed that the internal personal data stored in the storage section 160 is not leaked out. For this reason, it is possible to guarantee the avoidance of leakage of the internal personal data by storing the internal personal data not in the storage section 150, but in the storage section 160. In this way, by combining and using the two application programs as mentioned above, it is possible to execute the process in which both the external data and the internal personal data are used.

Next, the server system according to the second embodiment of the present invention will be described in detail. The second embodiment is different from the first embodiment in the internal structure and operation of the program executing section 130. The system structure, the structure of the program executing apparatus, and the function of each section in the second embodiment are same as those of the first embodiment shown in FIG. 2.

Figure 11:
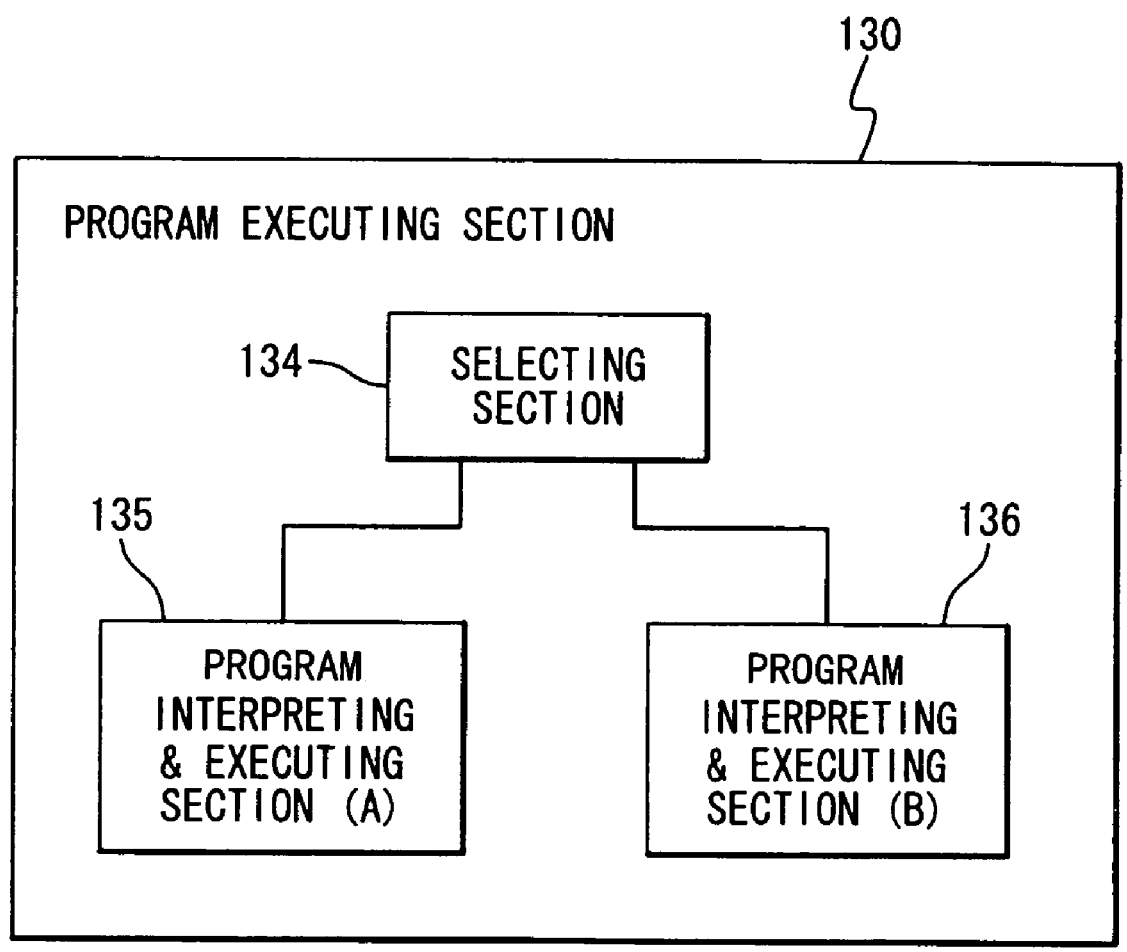
FIG. 11 is a block diagram showing the structure of the program executing section in the program executing apparatus according to a second embodiment of the present invention.

The structure and operation of the program executing section 130 will be described in detail. FIG. 11 shows the detailed structure of the program executing section 130 in the second embodiment. In FIG. 11, the program executing section 130 is composed of the program interpreting and executing section (A) 135 and program interpreting and executing section (B) 136 which have a function to interpret an application program and to execute processes described in the application program, and a selecting section 134 which selects one of the program interpreting and executing sections 135 and 136 by which the application program is executed.

Each of the program interpreting and executing section 135 and the program interpreting and executing section 136 interprets the application program, determines the processes to be executed, and executes the processes. However, the program interpreting and executing section (A) 135 does not execute any process of the process group B, and the program interpreting and executing section (B) 136 does not execute any process of the process group A. The selecting section 134 selects one of the program interpreting and executing section 135 and the program interpreting and executing section 136 to execute a specified program. The method of selecting the program interpreting and executing section may be optional if the result is unique. In an example of the selecting method, the selecting section 134 first interprets the specific application program in order, and selects the program interpreting and executing section (A) 135 when a process of the process group A is contained therein, and selects the program interpreting and executing section (B) 136 otherwise.

Also, in another example, the attribute of the application program is referred to and the program interpreting and executing section is selected in accordance with the attribute. In this case, the server 200 adds the attribute to the application program when providing the application program and, in the program acquiring section, it is necessary to acquire the application program with the attribute.

FIGS. 12 and 13 are flow charts showing the operations of program interpreting and executing sections 135 and 136. That is, the program interpreting and executing section 135 is permitted to execute processes other than a read process from the storage section 160 (Steps S21, S22). The read process from the storage section 160 is not permitted (Steps S21, S23). Also, the program interpreting and executing section 136 is permitted to execute processes other than a communication process and a write process from the storage section 150 (Steps S31, S32). The communication process and the write process into the storage section 150 are not permitted (Steps S31, S33).

From the above structure, one application program is executed in either of the program interpreting and executing section 135 or the program interpreting and executing section 136. Each of the program interpreting and executing sections 135 and 136 does not have a function to carry out processes of both the process group A and the process group B. Therefore, processes of the process group A and processes of the process group B are guaranteed to be never executed in the identical program.

It should be noted that the method of realizing the program interpreting and executing section 135 and the program interpreting and executing section 136 in the program executing section 130 may be optional if it is guaranteed that only processes of the process group A or only processes of the process group B are executed in a program interpreting and executing section. For example, there is a method of using libraries previously prepared to execute an application program. In case of the method in which the application program uses the library, each of the two libraries may be provided to have an execution function of only one of the process group A and the process group B, and a single program interpreting and executing section may selectively use the two libraries. Also, for use of the two application programs, it is necessary to link the two application programs to share the storage section 150. This linking operation is carried out based on the specification of the two application programs on the operating system by the user before the two application programs are executed.

In the embodiment shown in FIG. 2, it is supposed that the process group B contains a read process from the storage section 160. However, when there is a reference process of another internal personal data, which the user does not want to be leaked out, in the processes executable by the program executing section 130, the reference process may be added to the process group B. Examples in this case are personal data 170 shown in FIGS. 8 to 10. Here, the internal personal data contains the data in the program executing apparatus 100 and the data which can be referred to through the program executing apparatus 100 by an external unit system. For example, the internal personal data is GPS data when the user has a global positioning system (GPS) together with the program executing apparatus 100.

There is a case that the position data acquired by GPS relates to the privacy of the user. The user does not want the GPS data to be leaked out. In this case, by adding "a position data acquiring process from the global positioning system" to the process group B, the avoidance of the leakage of the GPS data can be guaranteed. Moreover, the program executing apparatus 100 may have a function to allow the user to add the process of the process group B from outside. Thus, the data whose disclosure the user permits can be set. For example, when the program executing apparatus 100 can use the global positioning system, it is possible to avoid the leakage of precision position data by adding "a process of acquiring the position data in the precision of 1 km or higher" to the process group B.

Also, in the above embodiments, "'communication process' and 'write process into the storage section 150'" in the process group A and "read process from the storage section 160" in the process group B are exemplified. However, when the storage section 150 is omitted from the program executing apparatus 100, "'communication process' and 'write process into the storage section 160'" in the process group A and "read process from the storage section 160" in the process group B may be used. That is, if the storage 150 and the storage section 160 are common and the common storage is a write-permitted memory to which the read process is not permitted, it is effective. In this case, the application program which executes a communication process is set to a state in which all the internal personal data cannot be accessed, including the internal data which are permitted to be disclosed. However, the structure of the system can be simplified.

Each process operation of the above-mentioned program executing apparatus 100 may be realized by reading the program with a CPU or computer if an operation procedure is stored previously in a storage medium (not shown) as the program.

As described above, according to the present invention, when a program is executed containing the reference process of data that the user does not want to be leaked out and the communication process with an external unit, an exclusive control is guaranteed between the reference process and the communication process. The avoidance the leakage of the data that the user does not want to be leaked outside can be guaranteed. Also, there is an effect that the process which uses both of the external data in the server and the internal data in the program executing apparatus by the program can be executed.

What is claimed is:

1. A program executing apparatus, comprising:
a first storage section which stores data permitted to be leaked out;
a second storage section which stores secret data of a user;
a communication section which can communicate with an external unit;
a program storage section which stores at least one application program; and
a program executing section which interprets and executes said at least one application program, checks whether said secret data could be leaked out to the external unit while interpreting said at least one application program, and stops the execution of said at least one application program when it is determined that said secret data could be leaked out to the external unit;
wherein the check of whether said secret data could be leaked out to the external unit is based on whether said at least one application program contains:
a process of writing data in said first storage section; and
a process of reading said secret data from said second storage section.

2. The program executing apparatus according to claim 1, wherein said program storage section stores an operating system, and
wherein said program executing section operates based on said operating system to interpret and execute said at least one application program, to check whether said secret data could be leaked out to the external unit while interpreting said at least one application program, and to stop the execution of said at least one application program when it is determined that said secret data could be leaked out to the external unit.

3. The program executing apparatus according to claim 1, further comprising:
a personal data generating section which generates personal data of the user;
wherein said secret data includes the generated personal data.

4. The program executing apparatus according to claim 1, wherein said program executing section comprises:
a status storage section which stores status data of said at least one application program, said status data being initially set to first data;
an interpreting and executing section which interprets and executes said at least one application program; and
an execution permission/non-permission determining section that:
sets said status data to second data when a process to be executed is the process of communicating with the external unit or the process of writing data in said first storage section,
sets said status data to third data when the process to be executed is the process of reading said secret data from said second storage section,
checks said status data each time the execution permission/non-permission deter-mining section interprets any process of said at least one application program,
stops the execution of said at least one application program if said status data is said third data when the process to be executed is the process of communicating with the external unit or the process of writing data in said first storage section, and
stops the execution of said at least one application program if said status data is said second data when the process to be executed is the process of reading said secret data from said second storage section.

5. The program executing apparatus according to claim 1, wherein said at least one application program is acquired from the external unit through said communication section and a communication channel.

6. The program executing apparatus according to claim 1, wherein said program executing apparatus is a mobile terminal, and
wherein said at least one application program is acquired from the external unit through said communication section and a wireless communication channel.

7. A program executing apparatus, comprising:
a first storage section which stores data permitted to be leaked out;
a second storage section which stores secret data of a user;
a communication section which can communicate with an external unit;
a program storage section which stores at least one application program; and
a program executing section which interprets and executes said at least one application program, checks whether said secret data could be leaked out to the external unit while interpreting said at least one application program, and stops the execution of said at least one application program when it is determined that said secret data could be leaked out to the external unit;
wherein the check whether said secret data could be leaked out to the external unit is based on whether said at least one application program contains:
a process of communicating with the external unit or a process of writing data in said first storage section; and
a process of reading said secret data from said second storage section;
wherein said program storage section stores a plurality of application programs including first and second application programs,
wherein said first application program contains the process of communicating with the external unit or the process of writing data in said first storage section, but does not contain the process of reading said secret data from said second storage section,
wherein said second application program contains the process of reading said secret data from said second storage section, but does not contain the process of communicating with the external unit or the process of writing data in said first storage section, and
wherein said program executing section executes one of said first and second application programs to use data manipulated based on the other one of said first and second application programs so that a combination of the data manipulated based on the other one of said first and second application programs and data manipulated based on the executed one of said first and second application programs is displayed.

8. The program executing apparatus according to claim 1, wherein said program storage section stores a plurality of application programs, and
wherein said program executing section comprises:

a first section which interprets and executes one or more of said plurality of application programs;
a second section which interprets and executes one or more of said plurality of application programs; and
a selecting section that:
   interprets programs to be executed from said plurality of application programs to determine whether said programs to be executed contain the process of communicating with the external unit, the process of writing data in said first storage section, or the process of reading said secret data from said second storage section,
   allocates programs to be executed from said plurality of application programs to said first section when said programs to be executed contain the process of communicating with the external unit or the process of writing data in said first storage section, and
   allocates programs to be executed from said plurality of application programs to said second section when said programs to be executed contain the process of reading said secret data from said second storage section.

9. A program executing method in a terminal, comprising the steps of:
   (a) interpreting and executing each of a plurality of application programs;
   (b) checking whether said secret data of a user in said terminal could be leaked out to an external unit, while interpreting each of said plurality of application programs; and
   c) stopping the execution of any of said plurality of application programs for which it is determined that said secret data could be leaked out to the external unit;
   wherein the terminal comprises:
      a first storage section storing data permitted to be leaked out; and
      a second storage section storing said secret data; and
   wherein said (b) checking step comprises the steps of:
      checking whether each of said plurality of application programs contains a process of communicating with the external unit or a process of writing data in said first storage section; and
      checking whether each of said plurality of application programs contains a process of reading said secret data from said second storage section.

10. The program executing method according to claim 9, wherein said (a) to (c) steps are executed based on an operating system in said terminal.

11. The program executing method according to claim 9, further comprising the step of:
   generating personal data of the user as a part of said secret data.

12. The program executing method according to claim 9, wherein said (b) checking step comprises the steps of:
   setting status data, which indicates a status of an application program being interpreted and is initially set to first data, to second data when a process to be executed of said application program being interpreted is a process of communicating with the external unit or a process of writing data in said first storage section;
   setting said status data to third data when the process to be executed of said application program being interpreted is a process of reading said secret data from said second storage section;
   checking said status data each time the process to be executed of said application program being interpreted is interpreted;
   stopping the execution of said application program being interpreted if said status data is said third data when the process to be executed is the process of communicating with the external unit or the process of writing data in said first storage section; and
   stopping the execution of said application program being interpreted if said status data is said second data when the process to be executed is the process of reading said secret data from said second storage section.

13. The program executing method according to claim 9, wherein one or more of said plurality of application programs is acquired from the external unit through a communication channel.

14. The program executing method according to claim 9, wherein said terminal is a mobile terminal, and
   wherein one or more of said plurality of application programs is acquired from the external unit through a wireless communication channel.

15. A program executing method in a terminal, comprising the steps of:
   (a) interpreting and executing each of a plurality of application programs;
   (b) checking whether said secret data of a user in said terminal could be leaked out to an external unit, while interpreting each of said plurality of application programs; and
   c) stopping the execution of any of said plurality of application programs for which it is determined that said secret data could be leaked out to the external unit;
   wherein the terminal comprises:
      a first storage section storing data permitted to be leaked out; and
      a second storage section storing said secret data; and
   wherein said (b) checking step comprises the steps of:
      checking whether each of said plurality of application programs contains a process of communicating with the external unit or a process of writing data in said first storage section; and
      checking whether each of said plurality of application programs contains a process of reading said secret data from said second storage section;
   wherein said plurality of application programs includes first and second application programs, by which a storage area of said first storage section is shared for specific data,
   wherein said first application program contains the process of communicating with the external unit to acquire said specific data and writing said specific data in the shared storage area of said first storage section, but does not contain the process of reading said secret data from said second storage section,
   wherein said second application program contains the process of reading said secret data from said second storage section and said specific data from the shared storage area of said first storage area, but does not contain the process of communicating with the external unit or writing any data in said first storage section,
   wherein a combination of said specific data and said secret data is displayed based on said second application program.

16. The program executing method according to claim 9, wherein said terminal comprises first and second sections, and
   wherein said method further comprises the steps of:
   interpreting each of said plurality of application programs to determine whether a respective application program contains the process of communicating with the external unit, the process of writing data in said first storage section, or the process of reading said secret data from said second storage section;

allocating said plurality of application programs to said first section so that said first section carries out said (a) to (c) steps when said respective application program contains the process of communicating with the external unit or the process of writing data in said first storage section; and allocating said plurality of application programs to said second section so that said second section carries out said (a) to (c) steps when said respective application program contains the process of reading said secret data from said second storage section.

* * * * *